United States Patent
Wittmaak, Jr. et al.

(10) Patent No.: US 12,312,070 B2
(45) Date of Patent: May 27, 2025

(54) HYDRAULIC ENERGY RETENTION

(71) Applicant: Textron Innovations Inc., Providence, RI (US)

(72) Inventors: John Robert Wittmaak, Jr., Newark, TX (US); Joseph Lee Spaeth, Fort Worth, TX (US); Marc Wayne Kinard, Corinth, TX (US)

(73) Assignee: Textron Innovations Inc., Providence, RI (US)

( * ) Notice: Subject to any disclaimer, the term of this patent is extended or adjusted under 35 U.S.C. 154(b) by 98 days.

(21) Appl. No.: 18/334,846

(22) Filed: Jun. 14, 2023

(65) Prior Publication Data
US 2024/0417067 A1  Dec. 19, 2024

(51) Int. Cl.
*B64C 13/40* (2006.01)
*F15B 21/14* (2006.01)
*B64C 29/00* (2006.01)

(52) U.S. Cl.
CPC ............ *B64C 13/40* (2013.01); *F15B 21/14* (2013.01); *B64C 29/0033* (2013.01); *F15B 2201/205* (2013.01); *F15B 2211/625* (2013.01)

(58) Field of Classification Search
CPC .... B64C 13/40; F15B 1/08; F15B 1/01; F15B 1/24; F15B 2201/205; F15B 2201/31
See application file for complete search history.

(56) References Cited

U.S. PATENT DOCUMENTS

| | | | | |
|---|---|---|---|---|
| 4,243,856 A | * | 1/1981 | Gratzmuller | F15B 1/08 |
| | | | | 73/745 |
| 2012/0085227 A1 | * | 4/2012 | Marin | F15B 1/24 |
| | | | | 92/23 |
| 2018/0274563 A1 | | 9/2018 | Elving et al. | |
| 2019/0120256 A1 | * | 4/2019 | Miller | F04B 23/02 |
| 2022/0213907 A1 | * | 7/2022 | Plamondon | F15B 1/265 |
| 2023/0096845 A1 | * | 3/2023 | Maro | F15B 1/04 |
| | | | | 138/31 |

OTHER PUBLICATIONS

Parker Aerospace, "Bootstrap Hydraulic Reservoirs," Parker Hannafin Corporation, Kalamazoo, Michigan, 2009, 2 pages.

* cited by examiner

*Primary Examiner* — Thomas E Lazo
(74) *Attorney, Agent, or Firm* — Bradley Arant Boult Cummings LLP

(57) ABSTRACT

A hydraulic energy retention system includes a body with a piston separating a hydraulic fluid from a pressurized gas, a discharge port in fluid communication with the hydraulic fluid, and a stop operable to an engaged position to block movement of the piston past the stop and toward the discharge port. The hydraulic energy retention system may be implemented with a hydraulic fluid reservoir, such as a bootstrap reservoir.

19 Claims, 9 Drawing Sheets

HYDRAULIC ENERGY RETENTION

TECHNICAL FIELD

This disclosure relates in general to the field of aircraft, and more particularly, but not by way of limitation, to aircraft hydraulic systems.

BACKGROUND

This section provides background information to facilitate a better understanding of the various aspects of the disclosure. It should be understood that the statements in this section of this document are to be read in this light, and not as admissions of prior art.

Hydraulic systems are commonly employed on aircraft to perform a variety of different operations. For example, hydraulic systems may be used to start one or more engines, move control surfaces, and apply wheel brakes, among other things. Many aircraft hydraulic systems require pressure on the return side suction of the hydraulic pump to prevent damaging cavitation. Hydraulic pressure bleeds off during downtime necessitating the use of hand pumps or ground carts to repressurize the system and add hydraulic fluid volume prior to startup. For aircraft operated from remote locations, ground carts may not be available and fly-away hand pumps and extra hydraulic fluid reservoirs increase weight and costs. As a result, some aircraft designs simply rely on startup with insufficient hydraulic pressure and fluid and the reduced component reliability caused by startup cavitation.

SUMMARY

An exemplary hydraulic energy retention system includes a body with a piston separating a hydraulic fluid from a pressurized gas, a discharge port in fluid communication with the hydraulic fluid, and a stop operable to an engaged position to block movement of the piston past the stop and toward the discharge port. The hydraulic energy retention system may be implemented with a hydraulic fluid reservoir, such as a bootstrap reservoir.

An exemplary aircraft hydraulic system includes a hydraulic circuit having a system pressure circuit and a return circuit, a pump with a pump outlet connected to the system pressure circuit and a pump inlet connected to the return circuit, a hydraulic accumulator with a piston separating a hydraulic fluid from a pressurized gas and a discharge port in communication with the hydraulic fluid and connected to the return circuit, and a stop operable to an engaged position to block movement of the piston past the stop and toward the discharge port.

An exemplary method of retaining hydraulic energy in an aircraft's hydraulic system includes using the hydraulic system having a hydraulic circuit with a system pressure circuit and a return circuit, a pump having a pump outlet connected to the system pressure circuit and a pump inlet connected to the return circuit, and a hydraulic accumulator with a piston separating a pressurized hydraulic fluid from a pressurized gas and a discharge port communicating the hydraulic fluid to the return circuit; running the pump thereby pressurizing the hydraulic circuit; turning off the pump; operating a stop, with the pump off, to an engaged position stopping movement of the piston past the stop and toward the discharge port thereby retaining the hydraulic fluid at the pump inlet at a selected pump inlet pressure; and restarting the pump after operating the stop to a disengaged position allowing movement of the piston toward the discharge port.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1A:
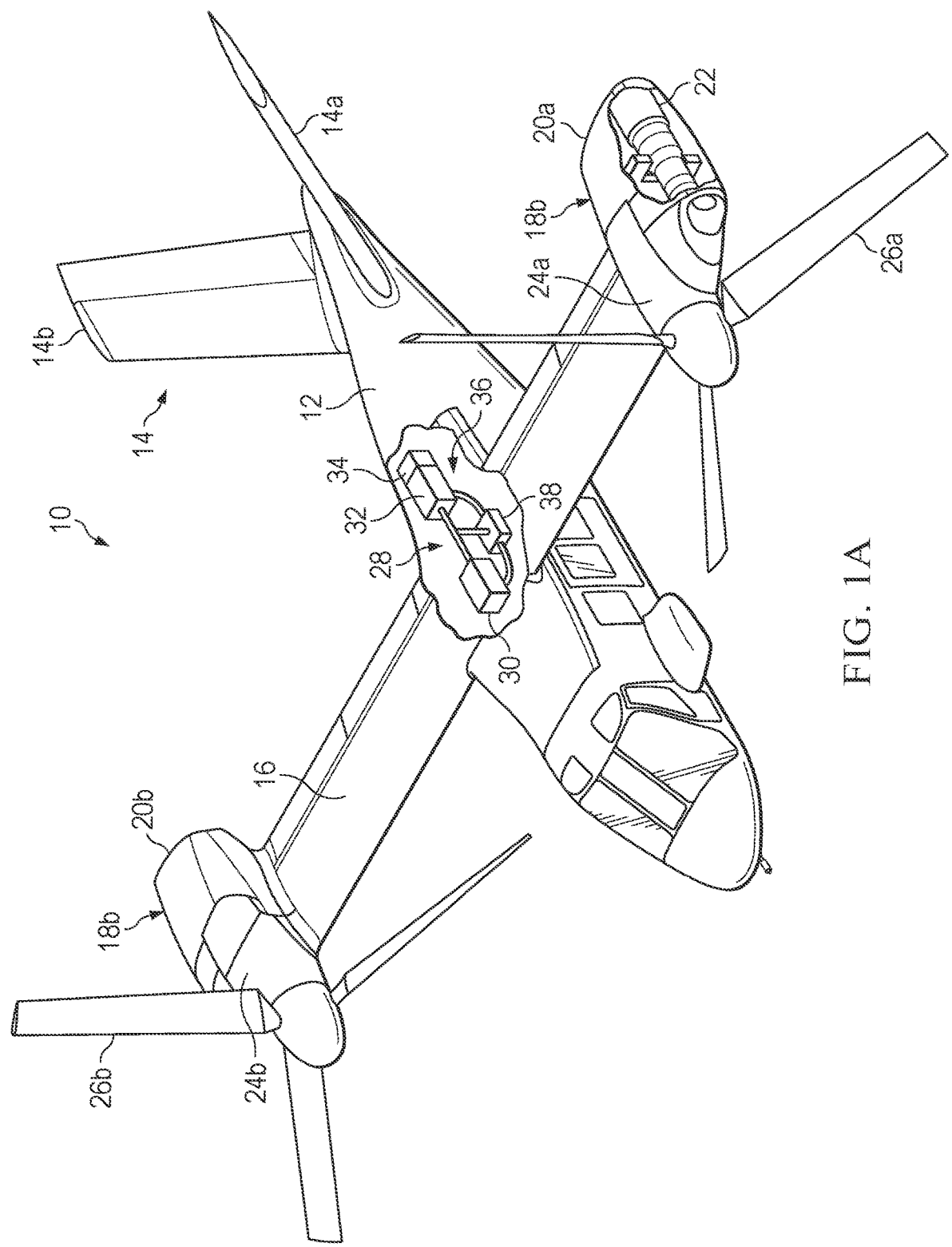
FIGS. 1A-1B are schematic illustrations of an exemplary tiltrotor aircraft implementing a hydraulic system with hydraulic energy retention in accordance with one or more aspects of the disclosure.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

Figure 1B:
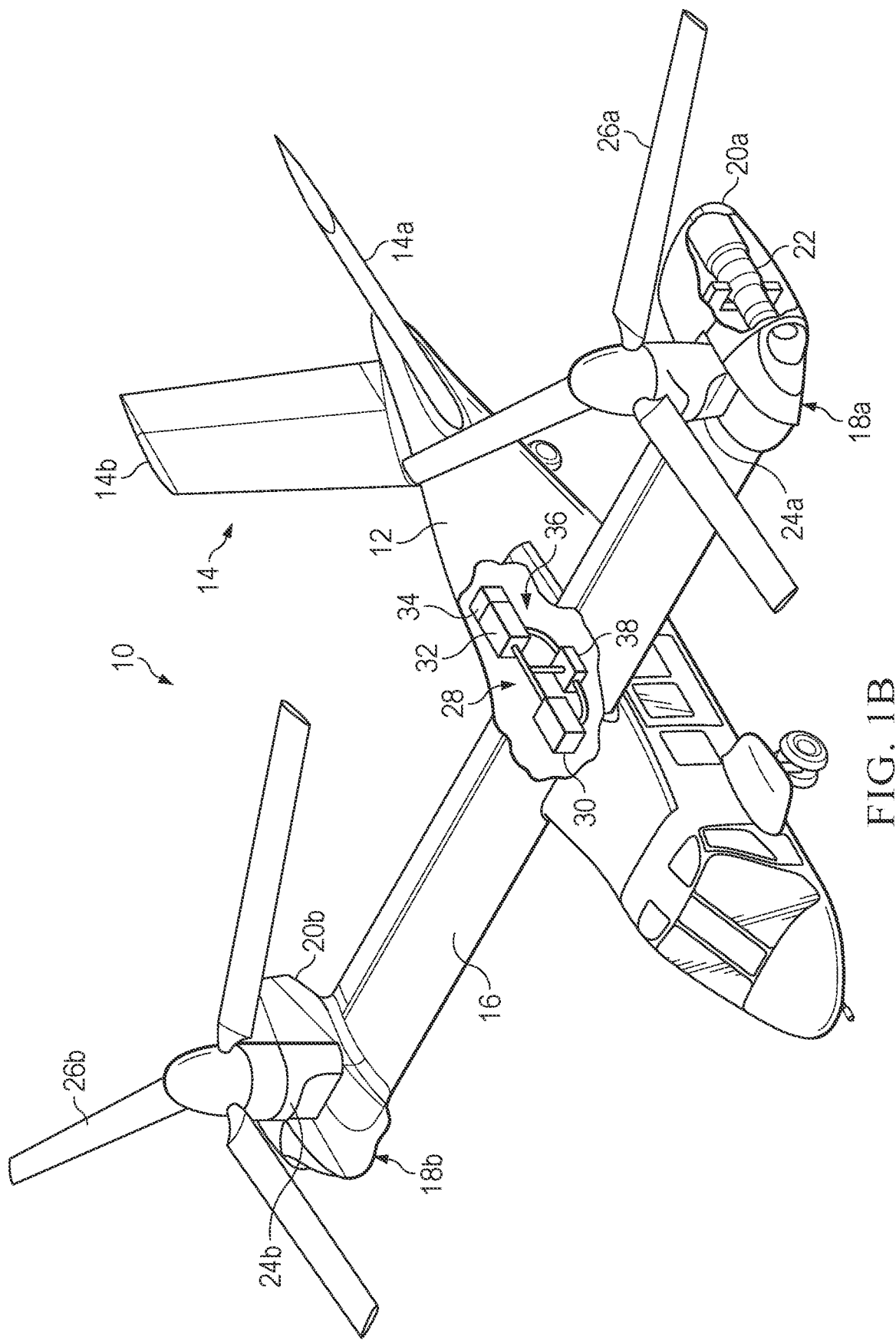

Referring to FIGS. 1A-1B, a tiltrotor aircraft is schematically illustrated and generally designated 10. Tiltrotor aircraft 10 includes a fuselage 12 and a tail section 14 including rotatably mounted tail members 14a, 14b having control surfaces operable for horizontal and/or vertical stabilization during forward flight. A wing 16 is supported by fuselage 12. Located at outboard ends of wing 16 are propulsion assemblies 18a, 18b. Propulsion assembly 18a includes a fixed nacelle 20a that houses an engine 22 and a transmission. In addition, propulsion assembly 18a includes a pylon assembly 24a that is rotatable relative to fixed nacelle 20a between a generally horizontal orientation, as best seen in FIG. 1A, and a generally vertical orientation, as best seen in FIG. 1B. Propulsion assembly 18a also includes a proprotor assembly 26a that is rotatable relative to pylon assembly 24a responsive to torque and rotational energy provided by a rotor hub assembly and drive system mechanically coupled to engine 22 and the transmission. Similarly, propulsion assembly 18b includes a fixed nacelle 20b that houses an engine and transmission, a pylon assembly 24b that is rotatable relative to fixed nacelle 20b and a proprotor assembly 26b that is rotatable relative to pylon assembly 24b responsive to torque and rotational energy provided via a rotor hub assembly and drive system mechanically coupled to the engine and transmission housed by fixed nacelle 20b. As used herein, the term "coupled" may include direct or indirect coupling by any means, including moving and/or non-moving mechanical connections.

FIG. 1A illustrates tiltrotor aircraft 10 in airplane or forward flight mode, in which proprotor assemblies 26a, 26b are rotating in a substantially vertical plane to provide a forward thrust enabling wing 16 to provide a lifting force responsive to forward airspeed, such that tiltrotor aircraft 10 flies much like a conventional propeller driven aircraft. FIG. 1B illustrates tiltrotor aircraft 10 in helicopter or vertical takeoff and landing (VTOL) flight mode, in which proprotor assemblies 26a, 26b are rotating in a substantially horizontal plane to provide a lifting thrust, such that tiltrotor aircraft 10 flies much like a conventional helicopter. It should be appreciated that tiltrotor aircraft 10 can be operated such that proprotor assemblies 26a, 26b are selectively positioned between forward flight mode and VTOL flight mode, which can be referred to as a conversion flight mode. Even though tiltrotor aircraft 10 has been described as having one engine in each fixed nacelle 20a, 20b, it should be appreciated by those having ordinary skill in the art that other engine arrangements are possible and are within the scope of the present disclosure including, for example, alternatively or additionally having an engine housed within fuselage 12 that provides torque and rotational energy to both proprotor assemblies 26a, 26b.

Tiltrotor aircraft 10 has a hydraulic system 28 that includes hydraulic subsystems 30, 32. Hydraulic subsystems 30, 32 each include a respective hydraulic pump that provides fluid pressure to various hydraulic-powered components on tiltrotor aircraft 10. Hydraulic subsystems 30, 32 have different power sources. Hydraulic subsystem 30 may be powered by one or more of the engines in the nacelles of propulsion assemblies 18a, 18b, or may be powered by an engine elsewhere on tiltrotor aircraft 10. Hydraulic subsystem 32 is powered by an auxiliary power unit 34. To reduce the weight and cost of tiltrotor aircraft 10, hydraulic subsystems 30, 32 share some components. In the illustrated example, hydraulic subsystems 30, 32 both utilize a shared return line subsystem 36 and a shared reservoir 38. Utilizing common plumbing in this manner eliminates unnecessary weight carried by aircraft that have two or more entirely independent hydraulic subsystems that share no componentry.

It should be appreciated that tiltrotor aircraft 10 is merely illustrative of a variety of aircraft that can implement the embodiments disclosed herein. Indeed, hydraulic system 28 may be utilized on any aircraft that uses hydraulics. Other aircraft implementations can include hybrid aircraft, tiltwing aircraft, quad tiltrotor aircraft, unmanned aircraft, gyrocopters, airplanes, jets, helicopters, and the like. As such, those of ordinary skill in the art will recognize that hydraulic system 28 can be integrated into a variety of aircraft configurations. It should be appreciated that even though aircraft are particularly well-suited to implement the embodiments of the present disclosure, non-aircraft vehicles and devices can also implement the embodiments, including, but not limited to, automobiles or land-based vehicles.

Figure 2:
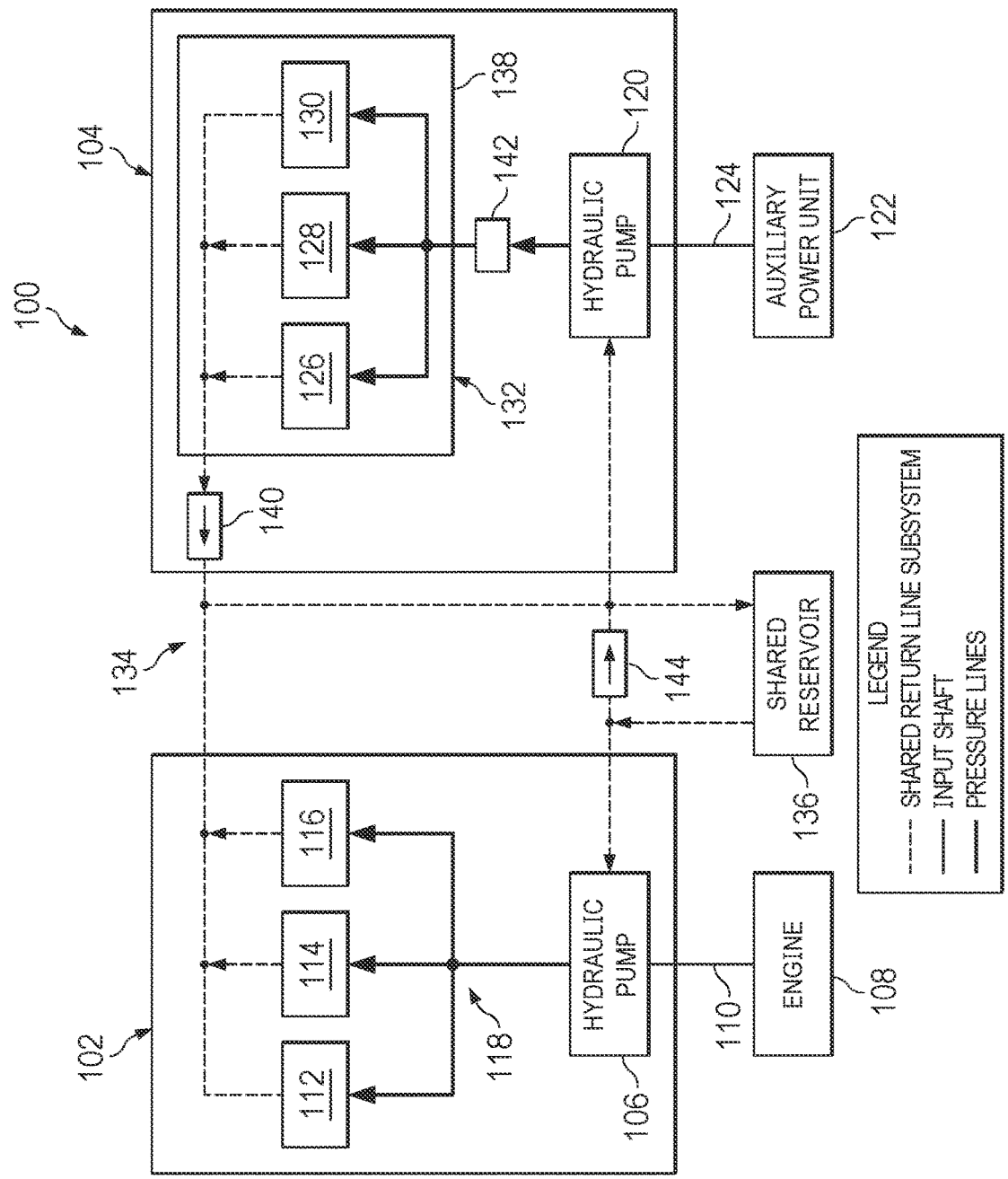
FIG. 2 is a schematic illustration of an exemplary aircraft hydraulic system according to one or more aspects of the disclosure.

Referring to FIG. 2, a hydraulic system for an aircraft is schematically illustrated and generally designated 100. Hydraulic system 100 includes hydraulic subsystems 102, 104. Hydraulic subsystem 102 includes hydraulic pump 106, which is powered by one or more engines 108 via input shaft 110 and/or an interconnect gearbox. Hydraulic subsystem 102 includes a set of hydraulic-powered components 112, 114, 116 in fluid communication with hydraulic pump 106. Hydraulic pump 106 pumps hydraulic fluid, which is shared between hydraulic subsystems 102, 104, to hydraulic-powered components 112, 114, 116 via system pressure lines 118. Hydraulic subsystem 104 includes hydraulic pump 120, which is powered by auxiliary power unit 122 via input shaft 124. In some embodiments, auxiliary power unit 122 may be an electric-start gas-powered engine. Hydraulic subsystem 104 includes a second set of hydraulic-powered components 126, 128, 130 in fluid communication with hydraulic pump 120. Hydraulic pump 120 pumps hydraulic fluid to hydraulic-powered components 126, 128, 130 via system pressure lines 132. Hydraulic pumps 106, 120 may each operate at any operating pressure, including an operating pressure in a range between 2,500 and 3,500 pounds per square inch, such as 3000 pounds per square inch. Hydraulic pumps 106, 120 may be any type of hydraulic pump, such as a variable displacement constant pressure hydraulic pump.

Hydraulic system 100 includes shared return line subsystem 134 in fluid communication with the first and second hydraulic subsystems 102, 104, thereby providing fluid communication between the first and second hydraulic subsystems 102, 104. Hydraulic system 100 also includes shared reservoir 136, which is in fluid communication with shared return line subsystem 134 and is shared by hydraulic subsystems 102, 104. Shared reservoir 136 stores hydraulic fluid that is used by first and second hydraulic subsystems 102, 104. Shared return line subsystem 134 returns the hydraulic fluid from hydraulic-powered components 112, 114, 116, 126, 128, 130 to hydraulic pumps 106, 120 and shared reservoir 136 so that the hydraulic fluid may recirculate through hydraulic system 100. In one embodiment, hydraulic subsystem 102 may be a flight essential hydraulic subsystem and hydraulic system 104 may be a non-flight essential hydraulic subsystem by which only hydraulic subsystem 102 includes hydraulic-powered components 112, 114, 116 that are essential during flight. In this embodiment, hydraulic-powered components 126, 128, 130 of hydraulic subsystem 104 may be components that are not essential during flight but are instead used during ground operations and pre-flight checks. Partitioning the functionality of hydraulic subsystems 102, 104 in this manner may be advantageous because of the shared mode failures resulting from the use of shared components, such as shared return line subsystem 134 and shared reservoir 136. In some embodiments, hydraulic subsystems 102, 104 may be functionally and temporally independent in that each hydraulic subsystem performs different respective functions non-simultaneously. In other embodiments, hydraulic subsystems 102, 104 may be temporally independent such that they are utilized non-simultaneously but have fully or partially overlapping functionality.

In addition, hydraulic subsystem 104 may be an isolated hydraulic subsystem 138 that is isolated from the remainder of hydraulic system 100, including hydraulic subsystem 102, so that a failure in hydraulic subsystem 104 does not affect the remainder of hydraulic system 100, including any flight essential hydraulic subsystems. The isolation of hydraulic subsystem 104 may be implemented using check valve 140, selector valve 142 and/or other components. Selector valve 142 may be opened or closed depending on whether hydraulic subsystem 104 is being utilized. In some embodiments, shared return line subsystem 134 may include check valve 144 so that hydraulic fluid used by hydraulic-powered components 112, 114, 116, 126, 128, 130 may be returned either directly to hydraulic pump 120 or indirectly to hydraulic pump 120 via shared reservoir 136, while hydraulic fluid is returned to hydraulic pump 106 via shared reservoir 136. As further described below, hydraulic system 100 may include one or more hydraulic energy retention systems in fluid communication with the inlet of hydraulic pump 106 and/or hydraulic pump 120, to retain a selected minimum hydraulic fluid pressure at the hydraulic pump inlet to restart the hydraulic pump after it has been shut off. It is known for the hydraulic fluid pressure and volume to bleed off when the hydraulic system has been shut-down requiring the return hydraulic circuit to be pressurized, e.g., at the reservoir, with a ground cart or hand-pump prior to restarting the hydraulic pump.

Figure 3:
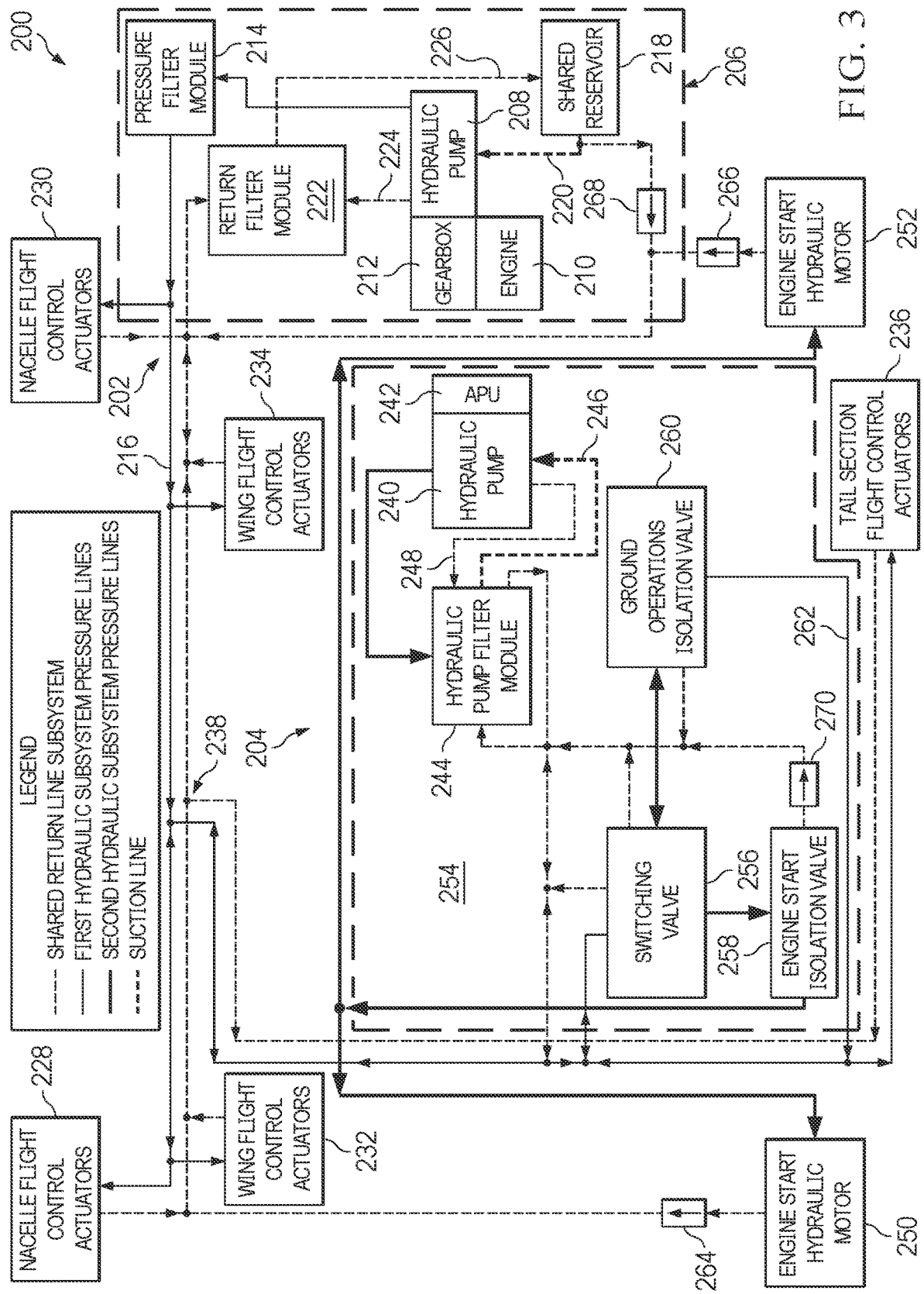
FIG. 3 is a schematic illustration of another exemplary aircraft hydraulic system according to one or more aspects of the disclosure.

Referring to FIG. 3, a hydraulic system for an aircraft is schematically illustrated and generally designated 200. Hydraulic system 200 includes a flight control hydraulic subsystem 202, which is a flight essential hydraulic subsystem, and a ground checkout and engine starting hydraulic subsystem 204, which is a non-flight essential hydraulic subsystem. Flight control hydraulic subsystem 202 includes a hydraulic power generation circuit 206 that includes hydraulic pump 208 powered by engine 210 via gearbox 212. Hydraulic pump 208 provides hydraulic pump pressure to pressure filter module 214, through which system pressure is provided to pressure lines 216. In one example, pressure filter module 214 may be equipped with a pressure transducer that supports a cockpit indication of system pressure and a mechanical delta pressure indicator that provides an indication of a dirty filter. Hydraulic system 200 includes shared reservoir 218, which stores hydraulic fluid and is in fluid communication with both flight control hydraulic subsystem 202 and ground checkout and engine starting hydraulic subsystem 204. Hydraulic pump 208 may receive hydraulic fluid from shared reservoir 218 via hydraulic pump suction line 220.

Hydraulic pump 208 may be in fluid communication with a return filter module 222 via a hydraulic pump case drain line 224. Return filter module 222 includes system and pump case drain fluid filters. Return filter module 222 may also be equipped with a temperature sensor that supports a cockpit indication of system fluid temperature as well as filter mechanical delta pressure indicators for both the return and case drain filters. The delta pressure indicators may provide an indication of a dirty filter. Hydraulic fluid may be returned to shared reservoir 218 from return filter module 222 via reservoir inlet line 226.

The hydraulic-powered components of flight control hydraulic subsystem 202 include nacelle flight control actuators 228, 230, wing flight control actuators 232, 234 and tail section flight control actuators 236. Nacelle flight control actuators 228, 230 may control one or more flight control surfaces on the nacelles of, for example, a tiltrotor aircraft such as that illustrated in FIGS. 1A-1B. The nacelle flight control actuators 228, 230 may also be used to control a pylon conversion actuator on the nacelles of a tiltrotor aircraft to change between VTOL and forward flight mode, as described in FIGS. 1A-1B. Wing flight control actuators 232, 234 may control one or more flight control surfaces on a wing of an aircraft, such as wing 16 illustrated in FIGS. 1A-1B. Tail section flight control actuators 236 may be used to control one or more flight control surfaces on the tail section of an aircraft, such as tail members 14a, 14b of tail section 14 illustrated in FIGS. 1A-1B. Indeed, the flight control actuators of flight control hydraulic subsystem 202 may control any flight control surface, such as ailerons, flaperons, spoilers, elevators, rudders, ruddervators, or any combination thereof. Other hydraulic-powered components that may be powered by flight control hydraulic subsystem 202 include one or more rotor swashplate flight control actuators or actuators to control tail wheel steering or wheel brakes. Flight control actuators 228, 230, 232, 234, 236 may be any type of actuator, such as one or more single system linear electro-hydraulic servo-actuators. In some embodiments, flight control hydraulic subsystem 202 may have a duplex or triplex redundant architecture as a safety measure in case of component failure. In addition to shared reservoir 218, hydraulic system 200 includes shared return line subsystem 238, which recirculates hydraulic fluid back to flight control hydraulic subsystem 202 and ground checkout and engine starting hydraulic subsystem 204.

Ground checkout and engine starting hydraulic subsystem 204 includes hydraulic pump 240, which is powered by auxiliary power unit 242. Hydraulic pump 240 may obtain hydraulic fluid from shared return line subsystem 238 via hydraulic pump filter module 244 and hydraulic pump suction line 246. Hydraulic pump 240 may drain into hydraulic pump filter module 244 via hydraulic pump case drain line 248. Hydraulic pump 240 pumps hydraulic fluid at a particular pressure to one or more ground operation components, such as engine start hydraulic motors 250, 252. Engine start hydraulic motors 250, 252 may include one or more engine start valves and be used to start the engines in the nacelles of a tiltrotor aircraft, such as those described in FIGS. 1A-1B. The hydraulic-powered components of both flight control hydraulic subsystem 202 and ground checkout and engine starting hydraulic subsystem 204, flight control actuators 228, 230, 232, 234, 236 and engine start hydraulic motors 250, 252, return hydraulic fluid back into shared return line subsystem 238. Shared return line subsystem 238 may then recirculate the hydraulic fluid back to hydraulic pump 208, hydraulic pump 240 and/or shared reservoir 218.

Engine start circuit 254 of ground checkout and engine starting hydraulic subsystem 204 may include one or more control valves and dedicated high-pressure routings to provide fluid power to engine start hydraulic motors 250, 252. Ground checkout and engine starting hydraulic subsystem 204 may power engine start hydraulic motors 250, 252 when switching valve 256, engine start isolation valve 258 and the engine start valves at engine start hydraulic motors 250, 252 are set in appropriate positions. Switching valve 256 may also be positioned to allow fluid pressure from hydraulic pump 208 of flight control hydraulic subsystem 202 to power engine start hydraulic motors 250, 252. In some embodiments, engine start circuit 254 may be powered by a ground cart. Embodiments disclosed herein utilize a hydraulic energy retention system that retains a sufficient hydraulic pressure and volume to power engine start circuit 254, e.g., the engine start hydraulic motor, without use of a ground cart or fly-away hand pump. A ground operations isolation valve 260 may be selectively opened to allow hydraulic pump 240 to provide hydraulic fluid to flight control actuators 228, 230, 232, 234, 236 via pressure line 262 during ground operations. With ground operations isolation valve 260 energized and the engines not running, hydraulic pump 240 can deliver fluid pressure to flight control actuators 228, 230, 232, 234, 236 for flight control function checks, including pre-flight checks, either when auxiliary power unit 242 is running or when ground power is connected from a hydraulic cart. In some embodiments, either one or both of hydraulic power generation circuit 206 or engine start circuit 254 may utilize one or more accumulators and/or heat exchangers to fine tune the operating pressure and hydraulic fluid temperature. In some embodiments, engine start circuit 254 may be in the fuselage of an aircraft. Flight control hydraulic subsystem 202 and ground checkout and engine starting hydraulic subsystem 204 may be isolated from one another using one or more check valves 264, 266, 268, 270, switching valve 256 or other components such that if, for example, one of the pressure lines of ground checkout and engine starting hydraulic subsystem 204 failed, then flight control hydraulic subsystem 202 would remain in a fully functional condition. By isolating the hydraulic subsystems in the aircraft from one another in this manner, the overall safety and reliability of the aircraft is improved.

Figure 4:
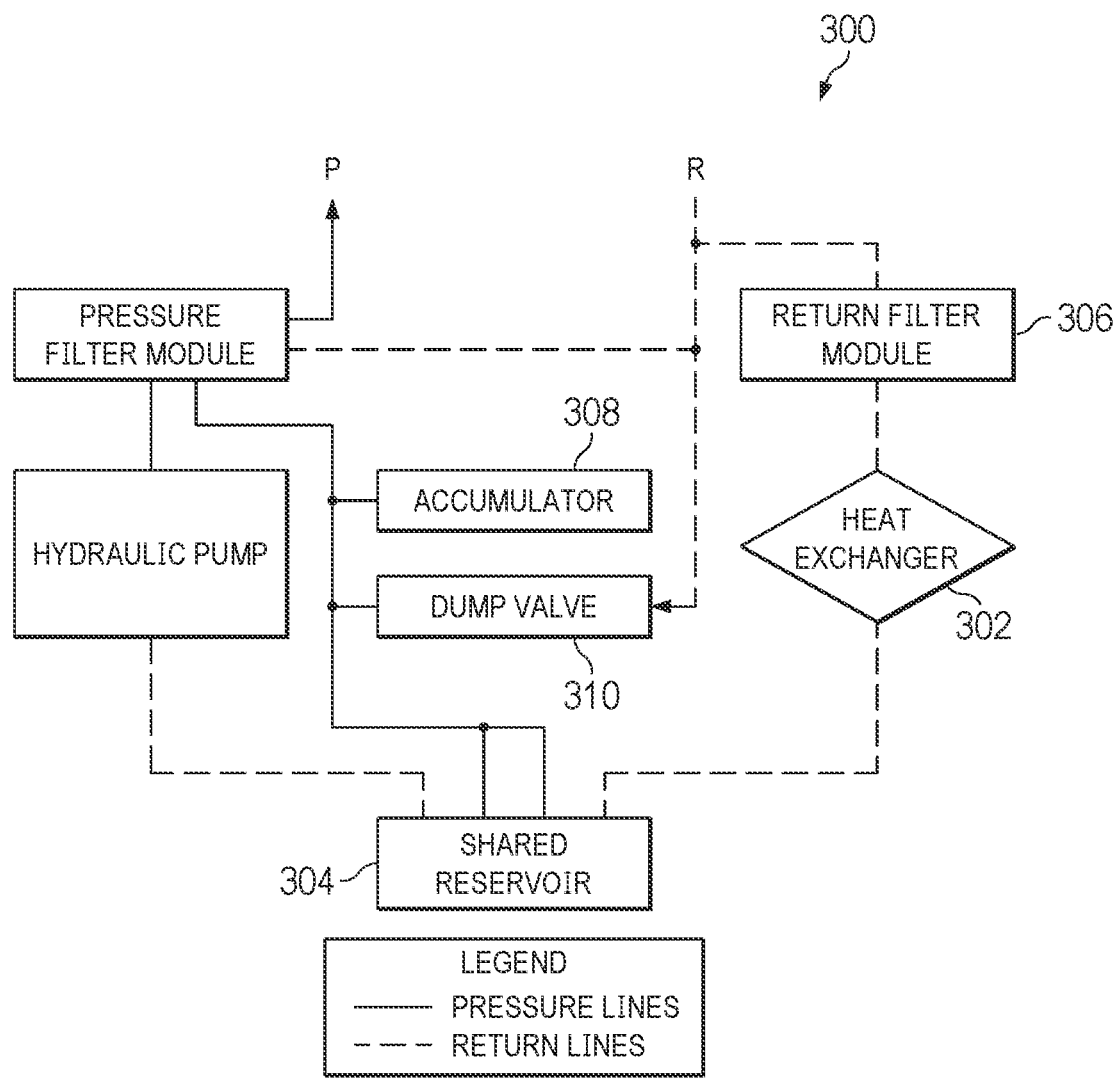
FIG. 4 is a schematic illustration of an exemplary hydraulic power generation circuit that may implement a hydraulic energy retention system according to aspects of the disclosure.

Referring to FIG. 4, a hydraulic power generation circuit is schematically illustrated and generally designated 300. Hydraulic power generation circuit 300 illustrates aspects that may be implemented in hydraulic power generation circuit 206 in FIG. 3. Hydraulic power generation circuit 300 includes heat exchanger 302, which cools hydraulic fluid flowing into shared reservoir 304 from return filter module 306. Heat exchanger 302 may be equipped with a thermostat and pressure relief valve to bypass the core when cooling the hydraulic fluid is not required or if the core becomes clogged. Hydraulic power generation circuit 300 includes a bootstrap reservoir accumulator 308 used to maintain the reservoir bootstrap return pressure to the hydraulic pump. A hydraulic energy retention system is connected to the return circuit and the inlet of the hydraulic pump. Bootstrap accumulator 308 may implement the hydraulic energy retention system, see e.g., FIG. 8. Hydraulic power generation circuit 300 also includes an accumulator dump valve 310 utilized to service accumulator 308 and relieve bootstrap pressure prior to maintenance. Dump valve 310 may also incorporate a high-pressure relief feature.

Figure 5:
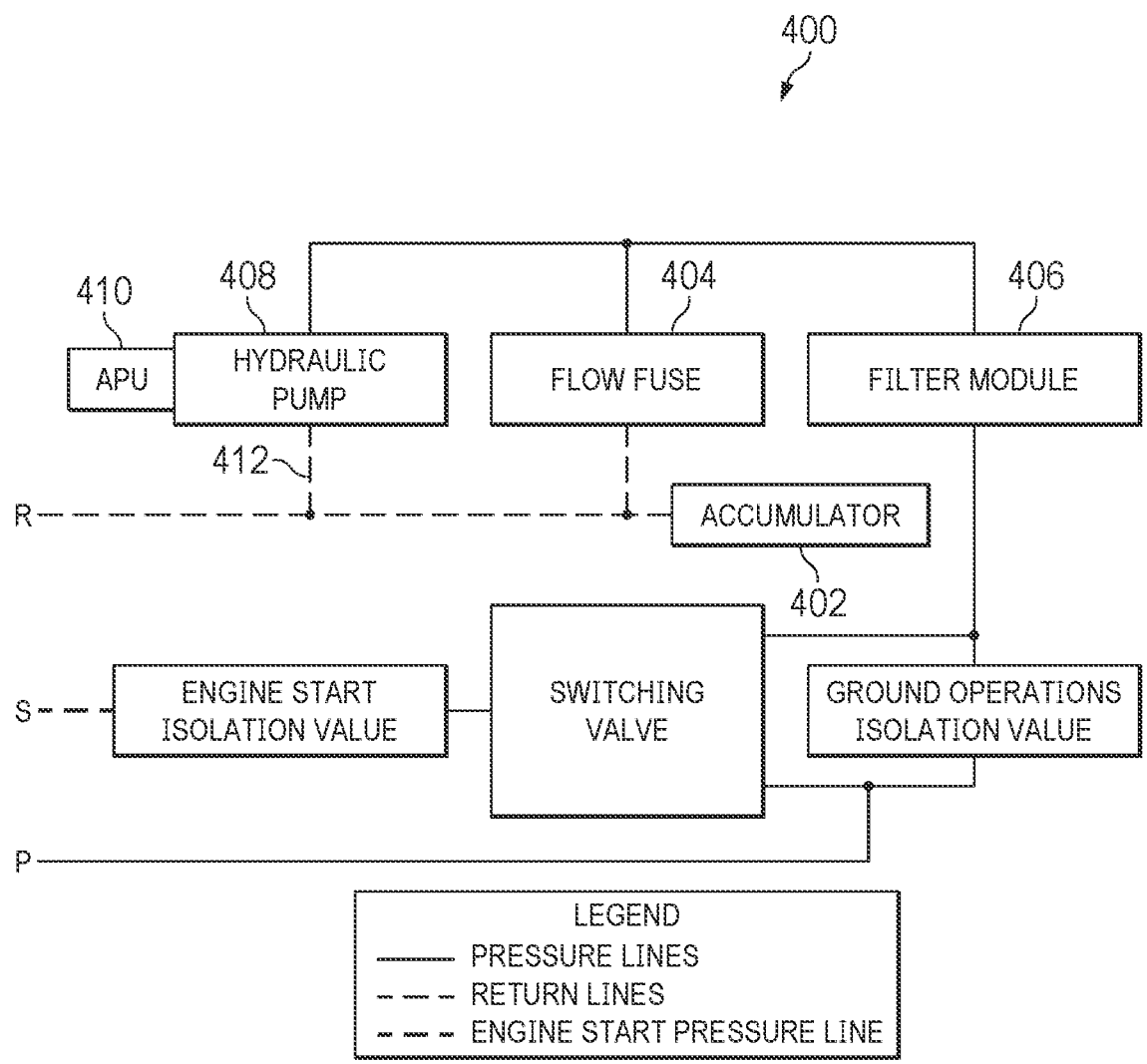
FIG. 5 is a schematic illustration of an exemplary engine start circuit that may implement a hydraulic energy retention system according to aspects of the disclosure.

Referring to FIG. 5, an engine start circuit is schematically illustrated and generally designated 400. Engine start circuit 400 illustrates aspects that may be implemented with engine start circuit 254 in FIG. 3. Included in engine start circuit 400 are pump inlet accumulator 402, flow fuse 404 and filter module 406. Accumulator 402 is used to maintain pump inlet pressure greater than a pump manufacturer minimum, and flow fuse 404 is used to unload hydraulic pump 408 while auxiliary power unit 410 is starting. In an embodiment, accumulator 402 is a hydraulic energy retention system configured to retain a selected minimum hydraulic pressure, while the pump and aircraft are off, at the inlet 412 of hydraulic pump 408 to enable restarting hydraulic pump 408 with at least the minimum inlet pressure desired to avoid cavitation without requiring use of a ground cart or fly-away pump.

Figure 6:
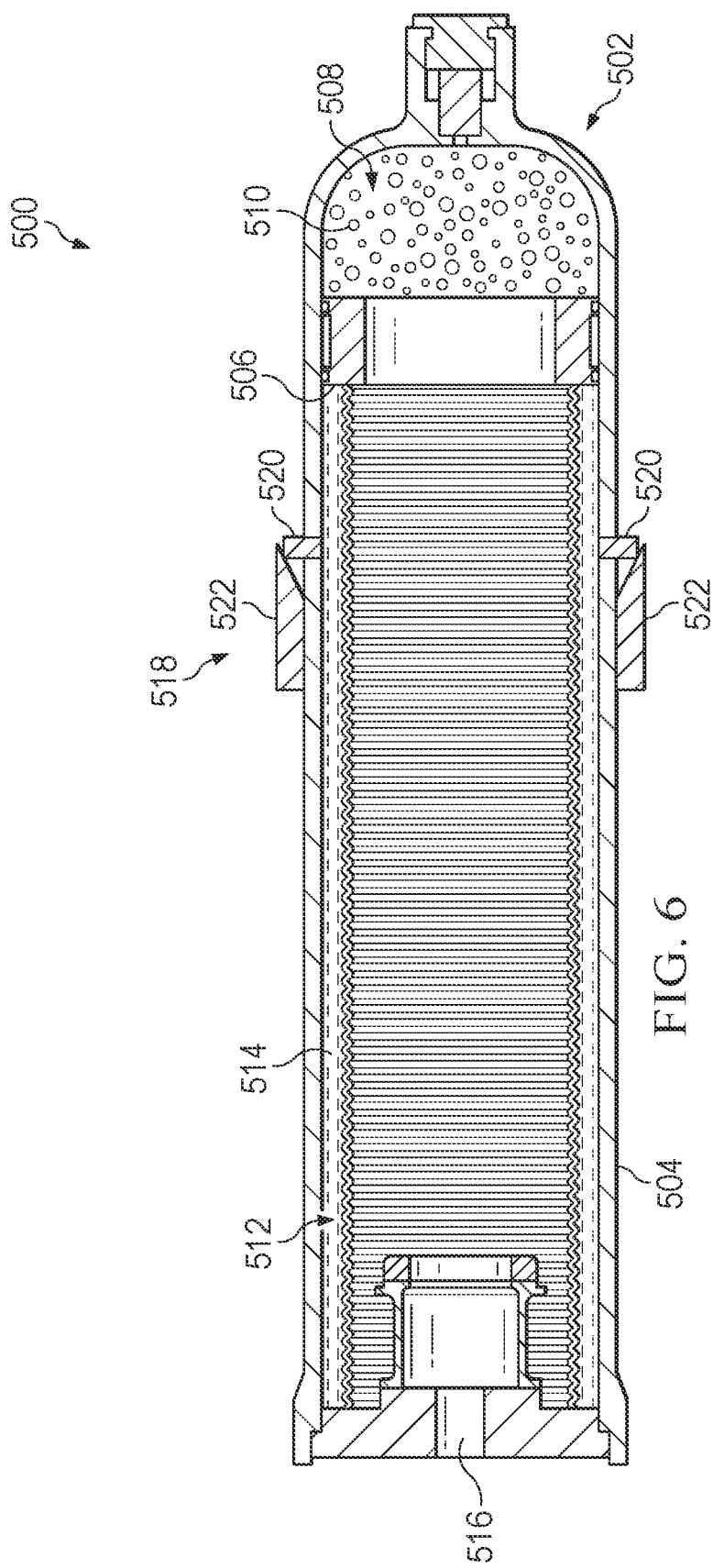
FIG. 6 illustrates an exemplary hydraulic energy retention system according to aspects of the disclosure.

FIG. 6 illustrates an exemplary hydraulic energy retention system 500. Hydraulic energy retention system 500 includes a hydraulic accumulator 502 having a body 504 internally disposing a piston 506 separating a chamber 508 containing pressurized gas 510 from a chamber 512 containing hydraulic fluid 514. Piston 506 may be a portion of bellows. A discharge port 516 is formed through body 504 in communication with chamber 512 and hydraulic fluid 514. The pressurized gas urges piston toward the discharge port to discharge the hydraulic fluid. Hydraulic retention system 500 includes stop 518 that is operable from a disengaged position (FIG. 6) to an engaged position (FIG. 7) to block movement of piston 506 past stop 518 and toward the discharge port. In the illustrated example of FIG. 6, stop 518 comprises pin 520 positioned between piston 506 and discharge port 516. In this example, pin 520 is located exterior of body 504 and in the engaged position the pin is pushed inside of chamber 512 thereby blocking piston 506 from moving toward the discharge port. Stop 518 is arranged such that, in the engaged position, piston 506 is permitted and free to move away from the discharge port allowing for expansion of the hydraulic fluid. An actuator 522 is operable for example manually or driven, e.g., a servo, to actuate stop 518 to the engaged position. Stop 518, e.g., pin 520, may be biased, for example with a spring, to the disengaged position (FIG. 6) allowing the piston to freely move toward the discharge port. Stop 518 is not limited to the pin arrangement shown in the exemplary embodiment of FIG. 6. The engaged position is selected to maintain a desired hydraulic pressure and fluid volume to supply the hydraulic pump inlet on start-up thereby eliminating the need to use a ground cart or other external source to pressurize the pump inlet for start-up.

Figure 7:
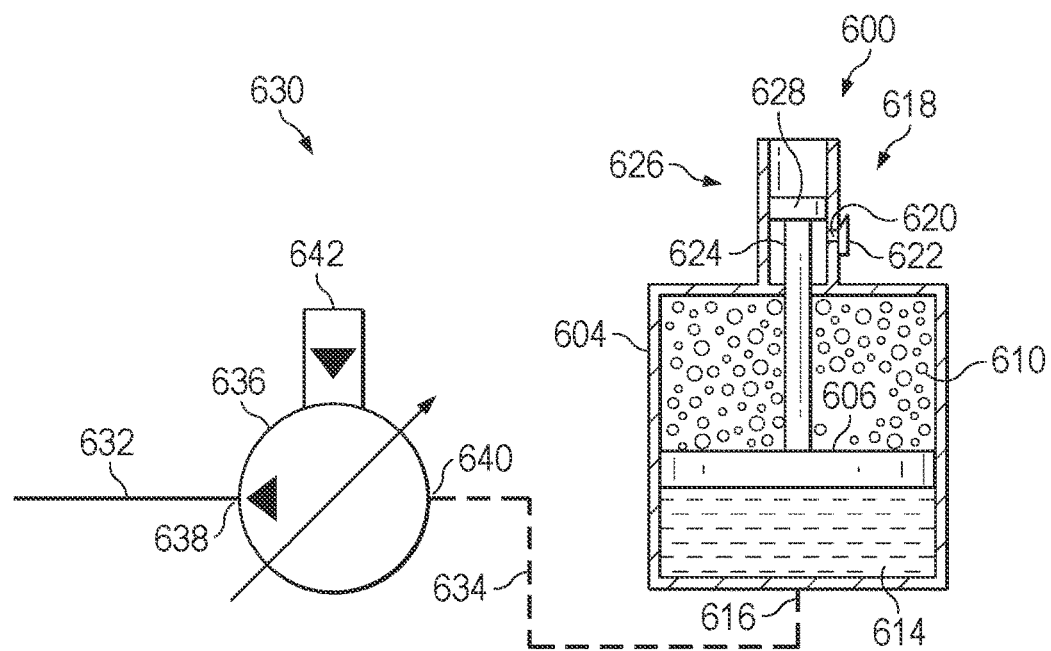
FIG. 7 illustrates an exemplary hydraulic circuit implementing an exemplary hydraulic energy retention system according to aspects of the disclosure.

FIG. 7 illustrates a hydraulic energy retention system 600 coupled to a hydraulic pump 636. Hydraulic energy retention system 600 is a hydraulic accumulator having a body 604 internally disposing a piston 606 separating pressurized gas 610 from hydraulic fluid 614. Discharge port 616 is formed through body 604 in communication with hydraulic fluid 614. The pressurized gas urges the piston toward the discharge port to discharge the hydraulic fluid. Hydraulic retention system 600 includes stop 618 that is operable to an engaged position to block movement of piston 606 past stop 618 and toward the discharge port. Stop 618 is arranged such that, in the engaged position, piston 606 is permitted and free to move away from the discharge port allowing for expansion of the hydraulic fluid. An actuator 622 is operable for example manually or driven, e.g., a servo, to actuate stop 618 to the engaged position. Stop 618, e.g., pin 620, may be biased for example with a spring, to a disengaged position allowing the piston to freely move toward the discharge port. In this example, a piston rod 624 is attached to piston 606. Piston rod 624 may be part of a linear variable differential transformer 626. Stop 618 is arranged such that in the engaged position it engages piston rod 624, or a shoulder 628, and thereby engages piston 606 and blocks movement of piston 506 toward the discharge port.

FIG. 7 also illustrates hydraulic energy retention system 600 implemented in a hydraulic system 630. Hydraulic system 630 includes a system pressure circuit 632 and a return circuit 634. A hydraulic pump 636 has a pump outlet 638 connected to system pressure circuit 632 and a pump inlet 640 connected to return circuit 634. Hydraulic pump 636 may include an auxiliary power unit 642. Discharge port 616 is connected to pump inlet 640, for example via return circuit 634. The engaged position is selected to maintain a desired hydraulic pressure and fluid volume to supply the hydraulic pump inlet on start-up thereby eliminating the need to use a ground cart or other external source to pressurize the pump inlet for start-up.

Figure 8:
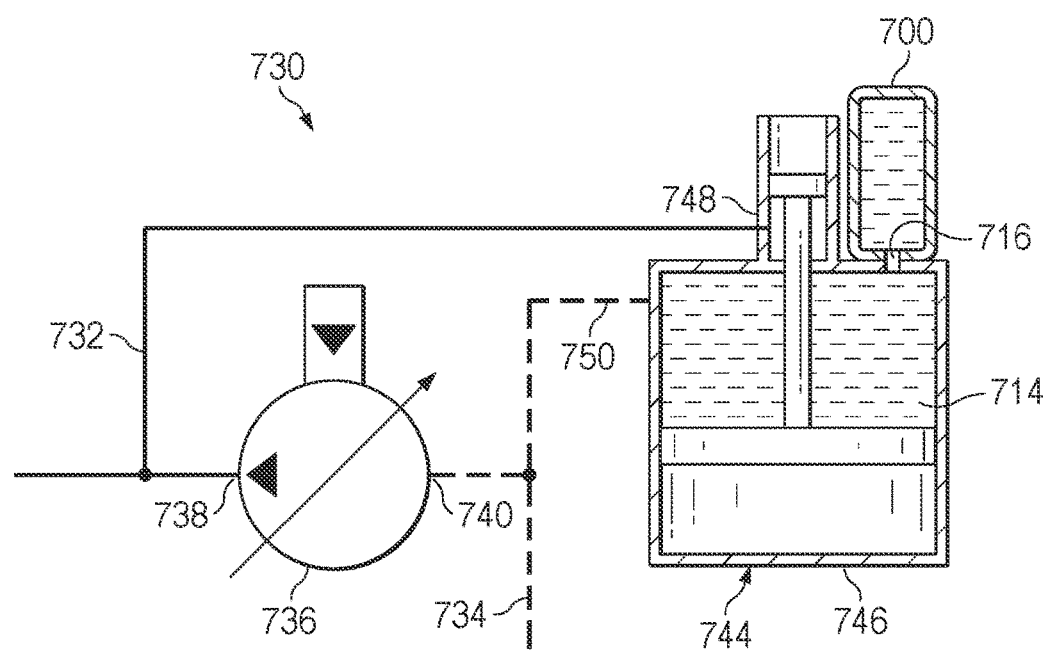
FIG. 8 illustrates another exemplary hydraulic circuit implementing an exemplary hydraulic energy retention system according to aspects of the disclosure.

FIG. 8 schematically illustrates another hydraulic circuit 730 implementing a hydraulic energy retention system 700, such as exemplary hydraulic energy retention systems 500, 600 in FIGS. 6 and 7. Hydraulic circuit 730 includes system pressure circuit 732 and return circuit 734. A hydraulic pump 736 has a pump outlet 738 connected to system pressure circuit 732 and a pump inlet 740 connected to return circuit 734.

Hydraulic circuit 730 includes a hydraulic fluid reservoir 744, e.g., bootstrap reservoir. Hydraulic fluid reservoir 744 is a body 746 holding a volume of hydraulic fluid 714 and includes a high-pressure input 748 connected to system pressure circuit 732 and a low-pressure outlet 750 connected to return circuit 734 and thus pump inlet 740. Discharge port 716 of hydraulic retention system 700 is connected to reservoir 744, i.e., the volume of hydraulic fluid 714.

Figure 9:
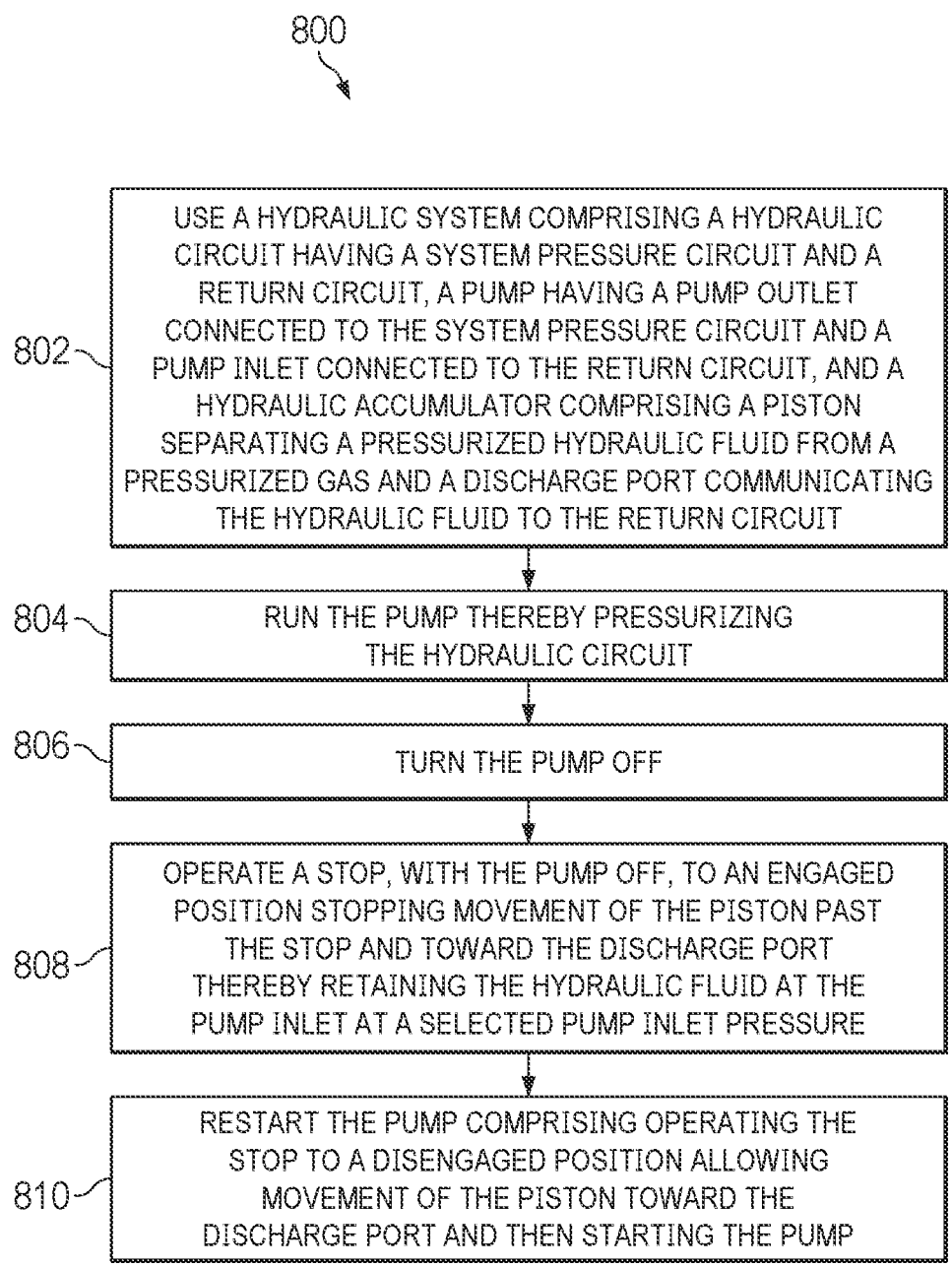
FIG. 9 is a flow diagram of an exemplary method of retaining hydraulic energy in a hydraulic system.

FIG. 9 is a flow chart of an exemplary method 800 of retaining hydraulic energy in a hydraulic system, for example an aircraft hydraulic system, when the hydraulic pump is off. At block 802, a hydraulic system is used having a hydraulic circuit with a system pressure circuit and a return circuit, a pump having a pump outlet connected to the system pressure circuit and a pump inlet connected to the return circuit, and a hydraulic accumulator comprising a piston separating a pressurized hydraulic fluid from a pressurized gas and a discharge port communicating the hydraulic fluid to the return circuit. At block 804, the pump is operated thereby pressurizing the hydraulic circuit. At block 806, the pump is turned off. At block 808, while the pump is turned off, a stop is operated to an engaged position stopping movement of the piston past the stop and toward the discharge port thereby retaining the hydraulic fluid at the pump inlet at a selected pump inlet pressure. At block 810, the pump is started after moving the stop to a disengaged position allowing the piston to move toward the discharge port.

Although relative terms such as "outer," "inner," "upper," "lower," and similar terms have been used herein to describe a spatial relationship of one element to another, it is understood that these terms are intended to encompass different orientations of the various elements and components in addition to the orientation depicted in the figures. Furthermore, as used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements. The terms "substantially," "approximately," "generally," and "about" are defined as largely but not necessarily wholly what is specified (and includes what is specified; e.g., substantially 90 degrees includes 90 degrees and substantially parallel includes parallel), as understood by a person of ordinary skill in the art. The extent to which the description may vary will depend on how great a change can be instituted and still have a person of ordinary skill in the art recognized the modified feature as still having the required characteristics and capabilities of the unmodified feature.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A hydraulic energy retention system, the system comprising:
    a body with a piston separating a hydraulic fluid from a pressurized gas;
    a discharge port in fluid communication with the hydraulic fluid; and
    a stop operable to an engaged position to block movement of the piston past the stop and toward the discharge port;
    wherein the stop, in the engaged position, allows the piston to move away from the discharge port.

2. The system of claim 1, wherein the stop comprises a pin positioned between the piston and the discharge port, wherein the pin extends into a path of the of the piston when in the engaged position.

3. The system of claim 1, wherein the stop comprises:
    a pin having a portion located exterior of the body; and
    an actuator movable into the engaged position where the actuator pushes the pin inside of the body between the piston and the discharge port.

4. The system of claim 1, further comprising a bootstrap reservoir having a low-pressure outlet and a high-pressure input, wherein the discharge port is in communication with the low-pressure outlet.

5. The system of claim 4, wherein the stop, in the engaged position, allows the piston to move away from the discharge port.

6. The system of claim 4, wherein the stop comprises:
    a pin having a portion located exterior of the body; and
    an actuator movable into the engaged position where the actuator pushes the pin inside of the body between the piston and the discharge port.

7. An aircraft hydraulic system, the system comprising:
    a hydraulic circuit comprising a system pressure circuit and a return circuit;
    a pump having a pump outlet connected to the system pressure circuit and a pump inlet connected to the return circuit;
    a hydraulic accumulator comprising a piston separating a hydraulic fluid from a pressurized gas and a discharge port in communication with the hydraulic fluid and the return circuit; and
    a stop operable to an engaged position to block movement of the piston past the stop and toward the discharge port.

8. The system of claim 7, wherein the stop, in the engaged position, allows the piston to move away from the discharge port.

9. The system of claim 7, wherein the stop comprises a pin positioned between the piston and the discharge port, wherein the pin extends into a path of the of the piston when in the engaged position.

10. The system of claim 7, wherein the stop comprises:
a pin having a portion located exterior of the hydraulic accumulator; and
an actuator movable into the engaged position where the actuator pushes the pin inside of the hydraulic accumulator between the piston and the discharge port.

11. The system of claim 10, wherein the stop, in the engaged position, allows the piston to move away from the discharge port.

12. The system of claim 7, further comprising a bootstrap reservoir having a low-pressure outlet connected to the return circuit and a high-pressure input connected to the system pressure circuit, wherein the discharge port is connected to the bootstrap reservoir.

13. The system of claim 12, wherein the stop, in the engaged position, allows the piston to move away from the discharge port.

14. The system of claim 12, wherein the stop comprises a pin positioned between the piston and the discharge port, wherein the pin extends into a path of the of the piston when in the engaged position.

15. The system of claim 12, wherein the stop comprises:
a pin having a portion located exterior of the hydraulic accumulator; and
an actuator movable into the engaged position where the actuator pushes the pin inside of the hydraulic accumulator between the piston and the discharge port.

16. A method of retaining hydraulic energy in an aircraft's hydraulic system, comprising:
using the hydraulic system comprising a hydraulic circuit having a system pressure circuit and a return circuit, a pump having a pump outlet connected to the system pressure circuit and a pump inlet connected to the return circuit, and a hydraulic accumulator comprising a piston separating a pressurized hydraulic fluid from a pressurized gas and a discharge port communicating the hydraulic fluid to the return circuit;
running the pump thereby pressurizing the hydraulic circuit;
turning off the pump;
operating a stop, with the pump off, to an engaged position stopping movement of the piston past the stop and toward the discharge port thereby retaining the hydraulic fluid at the pump inlet at a selected pump inlet pressure; and
restarting the pump comprising operating the stop to a disengaged position allowing movement of the piston toward the discharge port and then starting the pump.

17. The method of claim 16, wherein the stop, in the engaged position, allows the piston to move away from the discharge port.

18. The method of claim 16, wherein the hydraulic system further comprises a bootstrap reservoir having a low-pressure outlet connected to the return circuit and a high-pressure input connected to the system pressure circuit, wherein the discharge port is connected to the bootstrap reservoir.

19. The method of claim 18, wherein the stop comprises:
a pin having a portion located exterior of the hydraulic accumulator; and
an actuator movable into the engaged position where the actuator pushes the pin inside of the hydraulic accumulator between the piston and the discharge port.

* * * * *